United States Patent [19]
Theuninck et al.

[11] Patent Number: 6,024,993
[45] Date of Patent: Feb. 15, 2000

[54] PELLETIZED-UREA CONTAINING FEED SUPPLEMENTS AND A PROCESS FOR MAKING SAME

[75] Inventors: Duane H. Theuninck, Minnetonka, Minn.; Glen Edward Schoen, Amarillo, Tex.

[73] Assignee: Cargil, Incorporated, Minneapolis, Minn.

[21] Appl. No.: 08/846,252

[22] Filed: Apr. 30, 1997

[51] Int. Cl.⁷ ........................................ A23K 1/22
[52] U.S. Cl. ........................... 426/74; 426/454; 426/512; 426/623; 426/641; 426/807
[58] Field of Search ..................... 426/807, 623, 426/454, 512, 641, 74

[56] References Cited

U.S. PATENT DOCUMENTS

| | | |
|---|---|---|
| 3,873,733 | 3/1975 | Moore . |
| 4,265,916 | 5/1981 | Skoch et al. . |
| 4,904,486 | 2/1990 | Donovan et al. . |
| 4,963,371 | 10/1990 | Miller . |
| 4,996,065 | 2/1991 | Van de Walle ........................... 426/72 |
| 4,997,469 | 3/1991 | Moore .................................... 426/807 |

*Primary Examiner*—Helen Pratt
*Attorney, Agent, or Firm*—Fitch, Even, Tabin & Flannery

[57] ABSTRACT

This invention is directed to increasing the efficiency of production including the rate of production of urea-containing pelletized feeds, increasing the nonprotein nitrogen content of such feeds and increasing the nonprotein nitrogen ("NPN") content of such feeds while improving or maintaining the gravitational flowability of such feeds when the feeds are subjected to material handling conditions, as when they are subjected to gravitational flow.

20 Claims, No Drawings

PELLETIZED-UREA CONTAINING FEED SUPPLEMENTS AND A PROCESS FOR MAKING SAME

This invention relates to urea-containing pelletized feeds for ruminant animals and the production of such pelletized feeds. More particularly, this invention is directed to increasing the efficiency of production including the rate of production of such feeds, increasing the nonprotein nitrogen content of such feeds and increasing the nonprotein nitrogen ("NPN") content of such feeds while improving or maintaining the flowability of such feeds when the feeds are subjected to material handling conditions, as when they are subjected to gravitational flow.

BACKGROUND

A ruminant animal's nutritional requirements generally are provided by forages, grains and other known feed stuffs. Pelleted feed supplements, however, are commonly used to provide nutritional fortification to the diets of ruminant animals, especially beef cattle in feedlots. These feed supplements generally have an organic component and inorganic component, each of which may form about one half, on a weight basis, of the feed supplement. The primary purpose of the feed supplement is to provide the animal with proteins, vitamins and minerals. The inorganic portion of the feed supplement frequently provides the animal with minerals and the organic portion frequently provides the animal with proteins. Ruminant animals have the capability to utilize NPN as a source of protein by virtue of bacterial conversion of NPN to protein in the stomach of the ruminant. NPN is inexpensive relative to using an organic protein source. Urea is commonly used as a source of NPN in pelleted supplements for ruminants.

When pelleted supplements containing urea are stored in vertical bins, however, it is often difficult to remove the supplements from the bin via gravitational flow. Urea-containing supplements tend to "hang-up" in the bin rather than flow freely. Precise mechanisms responsible for this problem are not well understood, but may be related to the hygroscopic nature of urea. A broad variety of measures have been used by both supplement manufacturers and supplement users to attempt to overcome this problem. These measures include minimizing steam addition during pelleting, dusting pellets with a fine, dry powder of calcium carbonate and installation of mechanical agitation equipment in the storage bins.

Ruminants such as feedlot cattle require a relatively high level of mineral supplementation in their diets. Hence, pelleted supplements tend to contain a high level of inorganic, particulate ingredients such as calcium carbonate and sodium chloride. These particulate inorganic materials constitute substantially all of the inorganic component of the feed and include mineral ingredients. Pelleted supplements also may include particulates such as urea in the organic portion of the feed. The latter mineral and urea particulates are abrasive and cause a high degree of resistance through a pelletization die. This resistance causes wear on manufacturing equipment and relatively poor production rates.

It is desirable to provide a method of increasing the efficiency and the rate production of pelletized feeds for ruminant animals, especially feeds which include a large portion of abrasive particulates such as urea and minerals such as calcium carbonate and sodium chloride.

It is desirable to provide a pelletized feed with an increased NPN content utilizing urea and a method for providing such a feed with an increased NPN content.

It also is desirable to provide a pelletized feed which includes urea and a method for improving the flowability of urea-containing pelletized feed.

SUMMARY OF THE INVENTION

The invention provides a method for increasing efficiency of production and the rate of the production of pelletized dry feed comprising abrasive particulates such as particulate urea and particulate inorganic materials, such as particulate minerals. In this aspect of the invention, the method comprises mixing aqueous ammonium polyphosphate with a dry feed blend which blend includes the abrasive particulates prior to the pelletization of the dry feed blend. The ammonium polyphosphate is mixed with the blend in an amount effective for providing an increase of the rate of production of pelletized feed at least about 3% relative to the production of a feed containing the same amounts of urea and inorganic materials without using ammonium polyphospate. In an important aspect, the invention is effective for increasing production rate of pelletized feed at least about 3% in a feed which has about from about 35 to about 65 weight percent urea and mineral particulate materials, based upon the weight of a prepelletized feed blend. In another important aspect, the ammonium polyphospate is mixed with the dry feed prior to pelletization such that the prepelletized feed contains at least about 0.3 weight percent ammonium polyphosphate. In another important aspect, sufficient ammonium polyphosphate and urea are mixed with the prepelletized feed to provide at least about 6.4 weight percent NPN in the pelletized feed and the amount of ammonium polyphosphate is effective for providing an increase in the rate of production of at least about 3%.

The invention in another aspect also provides a method for increasing the NPN content of a pelletized dry feed by balancing the urea and ammonium polyphospate content of the feed such that the pelletized feed has NPN content of at least about 5.6 weight percent and the pelletized feed of the invention has improved gravitational flowability compared to a pelletized feed without ammonium polyphosphate with the same NPN content. In an important aspect, the method comprises mixing ammonium polyphospate and urea with a feed blend to provide a pelletized dry feed having an NPN content of at least about 6.4 weight percent where the ammonium polyphosphate is in an amount effective for providing the pelletized feed with improved flowability compared to a pelletized feed without ammonium polyphosphate with the same NPN content.

In yet another aspect, the invention provides a pelletized dry feed comprising ammonium polyphosphate and urea in amounts effective for providing the pelletized feed with an NPN content of at least about 5.6 weight percent, and in an important aspect at least about 6.4 weight percent, the pelletized feed of the invention having improved gravitational flowability compared to a pelletized feed without ammonium polyphosphate with the same NPN content. In an important aspect the prepelletized feed has at least about 0.6 to about 2.4 weight percent ammonium polyphosphate, based upon the weight of the prepelletized feed blend including ammonium polyphosphate, with the remainder of the NPN being supplied by urea.

The invention also contemplates a pelletized dry feed with a high NPN content of at least about 8.0 up to about 11.5 or more weight percent where the prepelletized feed blend comprises urea and at least about 0.6 weight percent ammonium polyphosphate, the urea and ammonium polyphosphate being effective for providing the nonprotein nitrogen content of the feed.

Further, the invention provides a method for improving the flowability of a pelletized urea-containing feed, the method comprising adding ammonium polyphosphate into the dry feed prior to pelletization in an amount effective for improving the gravitational flowability of the pelletized feed containing the same relative amount of urea, but without ammonium polyphosphate.

DESCRIPTION OF THE PREFERRED EMBODIMENTS

Definitions

Percentage of NPN means percentage of nonprotein nitrogen and is related to protein equivalents in that approximately 16.0 weight percent of protein is nitrogen. Hence, to get the protein equivalents from the weight percent NPN, multiply weight percent NPN by 6.25. Conversely, if the protein equivalent number is 40, the NPN weight percent is obtained by dividing 40 by 6.25 to indicate a NPN weight percent of 6.4.

Flowability means flowability under field material handling conditions using gravity. In the field, feed is moved from container to container using gravity. Hence, material handling using the invention and gravity to move pelletized feed is compared to material handling using gravity without the invention.

The percentage of ingredients in the prepelletized feed blend and the pelletized feed are assumed to be about the same. For clarity and consistency with the examples, this specification will sometimes refer to a weight percent based upon the weight of the prepelletized feed, but this percentage should be the same or very close to the percentage amount for the same ingredient in the pelletized feed.

Preferred Embodiments

This invention has several aspects. The pelletized dry feed supplement has an organic portion and an inorganic portion. The pelletized dry feed supplement is made by mixing aqueous ammonium polyphosphate and a dry feed blend which includes feed grade urea. Prior to the mixing of aqueous ammonium polyphosphate, the dry feed blend generally does not have more than about 15 weight percent moisture, and preferably does not have more than about 10 to 13 weight percent moisture, based upon the weight of the "dry" feed. Generally the feed blend has from about 35 to about 65 weight percent abrasive particulates which include urea and a particulate mineral portion. These particulates make pelletization through a pelletization die difficult. In one aspect of the invention aqueous ammonium polyphospate is mixed into the dry feed blend in amount sufficient to provide a prepelletized feed blend with at least about 0.3 weight percent ammonium polyphosphate based upon the weight of the feed blend which includes the ammonium polyphosphate to increase the rate of production of pelletized feed at least 3%. The amount of ammonium polyphosphate mixed with the feed blend is a function of the ingredients in the blend, especially the amount of particulate inorganic minerals and urea in the blend. The particle size of these abrasive particles vary from powder up to about 1000 microns. Because these materials tend to make extrusion of the pellets difficult, sufficient ammonium polyphosphate should be added to the dry feed blend in an amount effective for increasing the rate of production at least 3%. In an important aspect, sufficient aqueous ammonium polyphosphate is mixed into the feed blend to provide the prepelletized feed blend with from about 0.6 to about 2.4 weight percent ammonium polyphosphate, based upon the total weight of the feed blend, including the aqueous ammonium polyphosphate. This is to provide an increase in the rate of production of the pelletized feed, even with prepelletized feed blends having a abrasive particulate contents as high as 65 weight percent, based upon the total weight of the feed blend including the aqueous ammonium polyphosphate.

The dry feed blend has an organic portion which includes:
1. Grains and grain byproducts such as corn, sorghum, wheat, grain screenings, wheat middling, distillers grains, rice bran, and corn gluten feed;
2. Urea as a NPN source;
3. Plant protein products, such as soybean meal, cottonseed meal, sunflower meal, peanut meal, and corn gluten meal;
4. Animal protein products, such as meat and bone meal, blood meal, and feather meal;
5. Roughage products, such as oat hulls, cottonseed hulls and soybean hulls;
6. Animal fat;
7. Vegetable oils; and
8. Vitamin supplements.

The dry feed also has an inorganic portion, such as calcium carbonate, magnesium carbonate, potassium chloride, copper sulfate, zinc oxide, zinc sulfate, copper chloride, iron oxide, iron sulfate, manganous oxide, cobalt carbonate, ammonium sulfate, calcium sulfate, monocalcium phosphate, dicalcium phosphate, sodium chloride, and magnesium oxide.

To build NPN content, the feed prepelletized blend will have at least one weight percent feed grade urea up to about 20 weight percent urea based upon the weight of the blend which includes ammonium polyphosphate. Ammonium polyphosphate and urea may be balanced in the feed, as will be discussed to provide an NPN content in the pelletized feed as high as 8 to 11.5 weight percent and above.

In another aspect the invention provides a method for increasing the NPN of a pelletized dry feed by balancing the urea and ammonium polyphospate content of the feed such that the NPN content of the pelletized feed is at least about 5.6 weight percent and the pelletized feed of the invention has improved gravitational flowability compared to a pelletized feed without ammonium polyphosphate with the same NPN content. In an important aspect, the method comprises mixing ammonium polyphospate and urea into a dry feed to provide a pelletized dry feed having an NPN content of at least 6.4 weight percent where the ammonium polyphosphate is in an amount effective for providing the pelletized feed with improved gravitational flowability compared to a pelletized feed without ammonium polyphosphate with the same NPN content. In this aspect of the invention the amount of aqueous ammonium polyphosphate mixed with the dry feed blend is an amount effective to provide the feed blend with at least about 0.6 weight percent ammonium polyphosphate, based upon the weight of the prepelletized feed blend including ammonium polyphosphate. In an important aspect the prepelletized feed blend will have at least about 2.0 weight percent ammonium polyphosphate and at least about 11 weight percent urea to provide an NPN content of the pelletized feed of about 6.4 weight percent.

The pelletized feed blend is made by mixing the organic portion and inorganic portion including the urea and particulate minerals in a ribbon mixer to achieve homogeneous mixing such as after about one minute in a ribbon mixer. Thereafter the ammonium polyphosphate is sprayed into the blend as an aqueous solution which is commercially available as a solution with 59 weight percent ammonium phosphate and 41 weight percent water. Thereafter, the blend which includes the ammonium polyphosphate is mixed for about 3 to about 5 minutes and is conveyed to a conditioning chamber where steam is introduced into the chamber to achieve a feed or meal conditioning temperature of from about 100 to about 130° F. The temperature of the feed at the die should not exceed about 160° F. Then, the warmed feed is dropped into a pelletizing die and formed into pellets. Thereafter, the warm pellets drop directly from the pelletmill into a cooler and are cooled using ambient air to within 10 degrees Fahrenheit of ambient temperature. The cooled pellets are then discharged and conveyed to a storage bin for eventual use.

The pelletization die usually is a cylinder with a plurality of holes in its curved walls with one or more rollers pushing the feed through the holes in the curved walls. A blade nips the pellets as they exit the holes. A fuller description of known pelletization equipment appears in Feed Manufacturing Technology, American Feed Industry Association, Inc., Arlington, Va., Vol. IV 1994, Ch. 10, pp. 111–130, which is rewritten herein.

The following examples illustrate how to practice the invention and make the pelletized feed of the invention.

EXAMPLE 1

A nutrient constant formula and a standardized formula as shown below are pelletized according to the following procedure. Production data also is shown below. This data shows the significance of the presence of ammonium polyphosphate increasing the production of pelletized urea-containing feed supplement. The formulations were pelletized as follows:

1.) Mixing—
   Scott Ribbon Mixer—¼ Ton
   Ingredients of each formula are hand scaled into weigh buggy and transferred to the mixer by elevator leg. The ammonium polyphosphate is sprayed onto the feed and the feed is mixed for five minutes.
2.) The mixed feed is conveyed by gravity into elevator leg and transferred to the pelletmill hopper.
3.) Pelletmill—
   California Pelletmill—Century Model—50 HP
   The pelletmill feeder meters the feed into the conditioner. The feed is mixed with steam to achieve the conditioning temperature. The warm feed falls out of the conditioner into the die chamber and is formed into pellets. The pelletmill die is 16 inch diameter, $^{10}/_{64}$ pellet hole diameter, with a 2 inch effective thickness, ¼ inch variable relief.
4.) Cooling—The pellets are transferred by a belt conveyor into a Wenger single pass horizontal cooler. The pellets are cooled by ambient air to within 10 deg F. of the ambient air temperature. The cooled pellets are belt conveyed to the bagging bin.

EXAMPLE 1

|  | Nutrient-Constant Formula | | Standardized Formula | |
| --- | --- | --- | --- | --- |
|  | Control | APP** | Control | APP |
| Formulations Evaluated* | | | | |
| Corn |  |  | 18.05 | 15.55 |
| Wheat midds | 60.79 | 61.54 | 61.38 | 61.38 |
| Soybean meal | 3.53 | | | |
| Urea | 10 | 10 | 10 | 10 |
| Salt | 6.25 | 6.75 | 6.75 | 6.75 |
| Calcium carbonate | 15.51 | 16.84 | | |
| Potassium chloride | 2.11 | 2.22 | 2.13 | 2.13 |
| Mono-dicalcium phosphate | 1.81 | 0.15 | 1.69 | 1.69 |
| Ammonium polyphosphate |  | 2.5 |  | 2.5 |
| Total | 100 | 100 | 100 | 100 |
| Nutrient levels | | | | |
| Protein | 41 | 41 | 41 | 42.34 |
| Crude fiber | 5.54 | 5.32 | 5.69 | 5.63 |
| Crude fat | 0.45 | 2.43 | 3.15 | 3.05 |
| Calcium | 6.5 | 6.75 | 0.39 | 0.41 |
| Phosphorus | 1 | 1 | 1 | 1.36 |
| NPN | 4.6 | 4.85 | 4.6 | 4.85 |
| Production Data | | | | |
| Batch size, lb | 500 | 500 | 500 | 500 |
| Runtime, min | 13.58 | 12.25 | 12.25 | 11.75 |
| Tons/hr | 1.1 | 1.22 | 1.22 | 1.28 |
| Production temperatures*** | | | | |
| Meal | 55 | 60 | 60 | 60 |
| Conditioned | 115 | 113 | 120 | 114 |
| Hot pellet | 160 | 163 | 159 | 145 |
| Die change | 45 | 50 | 39 | 31 |
| Cool pellet | 96 | 96 | 72 | 74 |
| Production dry matters | | | | |
| Meal | 91 | 87.55 | 86.57 | 86.49 |
| Conditioned | 87.5 | 86.93 | 84.72 | 83.82 |
| Cool pellet | 89.88 | 90.04 | 87.28 | 86.77 |
| PDI**** | 98.4 | 98.6 | 98 | 97.8 |
| Density | 36.9 | 36.5 | 35.55 | 35.05 |

*Formulations are weight percent
**APP is ammonium polyphosphate with the percentage of ammonium polyphospate being the percent of a solution comprising 59 weight percent ammonium polyphosphate and 41 weight percent water.
***Degrees F
****Pellet Durability Index

EXAMPLE 2

The ingredients listed in Table A are conveyed from storage bins into a scale hopper located directly above a Hayes and Stoltz three ton ribbon mixer. The ingredients are individually weighed in the scale hopper to provide the weight percentages listed in Table A and are allowed to fall by gravity into the mixer. The dry ingredients are mixed for about 30 seconds to one minute, the ammonium polyphosphate is sprayed thereon and mixing is continued for 3–5 minutes to form a uniform blend. The uniform blend is placed in a surge hopper and then is conveyed to a pellet mill hopper. The uniform blend was metered from the pellet mill hopper into the conditioning chamber of a 250 horsepower California Pelletmill. Steam is introduced into the chamber to achieve a meal conditioning temperature of from about 100 to 130° F. This warmed meal was dropped into the die and formed into pellets.

The warm pellets drop directly from the pelletmill through an airlock into the California Pelletmill Cooler (Model 2400×2400) and are cooled using ambient air to within 10 degrees Fahrenheit of ambient temperature. Pellets are discharged when cooled and are transferred by elevator into a storage bin for eventual use. The pellets made according to the above procedure are gravitationally flowable.

TABLE A

| Ingredients | % Used |
| --- | --- |
| Feather meal | 12.000 |
| Distillers grains | 12.500 |
| Urea | 11.94 |
| Salt | 3.93 |
| Calcium carbonate | 17.270 |
| Potassium chloride 50 | 5.84 |
| Sunflower meat | 6.77 |
| Mono-dicalcium phosphate | 1.55 |
| Ammonium polyphosphate | 2.000 |
| Ammonium sulfate | 5.000 |
| Zinc sulfate | 0.096 |
| Mineral ad | 3.000 |
| Trace mineral Premix | 0.250 |
| Peanut meal | 17.55 |
| Total | 100.000 |

TABLE B

| Nutrient Levels | Amount |
| --- | --- |
| Protein % | 67.000 |
| Fat % | 2.25 |
| Calcium % | 7.850 |
| Phosphorus % | 0.930 |
| Magnesium % | 0.75 |
| NPN % | 6.7 |
| Sulfur % | 1.500 |
| Potassium % | 3.26 |
| Dry matter % | 94.63 |

EXAMPLE 3

The ingredients in Table A below were pelletized as described in example 2 and provided a flowable pelletized product.

| Ingredients | % Used |
| --- | --- |
| Rice bran - high fat | 9.000 |
| Distillers grains | 5.000 |
| Urea | 22.950 |
| Salt | 4.100 |
| Potassium chloride 50 | 1.15 |
| Sunflower meal | 5.85 |
| Mag ox 54 | 1.88 |
| Mono-dicalcium phosphate | 0.310 |
| Ammonium polyphosphate | 1.000 |
| Ammonium sulfate | 1.500 |
| Copper sulfate | 0.050 |
| Trace mineral premix | 1.52 |
| Peanut meal | 21.89 |
| Calcium carbonate | 23.81 |
| Total | 100.000 |

| Nutrient Levels | Amount |
| --- | --- |
| Protein % | 84.000 |
| Fat % | 2.46 |
| Calcium % | 9.600 |
| Phosphorus % | 0.600 |
| Iodine MG/KG | 12.62 |
| Manganese MG/KG | 1,367.79 |
| Salt % | 4.000 |
| Zinc MG/K | 2529.880 |
| Copper MG/K | 519.87 |
| Iron MG/K | 94.84 |
| Magnesium % | 1.500 |
| Cobalt MG/K | 3.79 |
| NPN % | 10.88 |
| Sulfur % | 0.436 |
| Potassium % | 1.000 |
| Dry matter % | 95.66 |
| Sodium % | 1.68 |
| Add Vit. A KIU/LB | 0.000 |
| Add Vit. E LB | 0.000 |

What is claimed is:

1. A method for increasing the rate of the production of pelletized dry feed comprising urea, organic materials and inorganic materials, the method comprising:

mixing ammonium polyphosphate with a dry particulate feed blend to provide a feed blend for pelletization which includes the ammonium polyphosphate in an amount effective for providing an increase of the rate of production of a pelletized feed of at least about 3% relative to the production of a pelletized feed containing the same amounts of particulates without ammonium polyphosphate, the feed blend for pelletization comprising at least about 35 weight percent abrasive particulates and the ammonium polyphosphate and urea in amounts effective for providing a pelletized feed having a nonprotein nitrogen content of at least 5.6 weight percent.

2. The method as recited in claim 1, wherein the ammonium polyphosphate in the prepelletized blend is at least about 0.3 weight percent, and wherein the prepelletized feed blend includes from about 35 to about 65 weight percent particulates selected from the group consisting of urea, one or more particulate minerals and mixtures thereof.

3. A method as recited in claim 1, wherein the feed blend for pelletization comprises at least about 0.6 weight percent ammonium polyphosphate.

4. A method for increasing the nonprotein nitrogen content of a pelletized dry feed comprising urea and ammonium polyphosphate, the method comprising:

balancing the urea and ammonium polyphosphate content of a feed blend for pelletization such that when the feed blend is pelletized, the pelletized feed has a nonprotein nitrogen content of at least about 5.6 weight percent, the feed blend for pelletization comprising at least about 35 weight percent abrasive particulates and the amount of ammonium polyphosphate in the pelletized feed being effective for providing improved gravitational flowability compared to a pelletized feed without ammonium polyphosphate with the same nonprotein nitrogen content.

5. The method as recited in claim 4 wherein the ammonium polyphosphate and urea are in relative amounts to provide a pelletized dry feed having a nonprotein nitrogen content of at least 6.4 weight percent where the ammonium polyphosphate is in an amount effective for providing the pelletized feed with improved gravitational flowability compared to a pelletized feed without ammonium polyphosphate with the same nonprotein nitrogen content.

6. The method as recited in claim 5 wherein the prepelletized feed blend comprises at least about 0.6 weight percent ammonium polyphosphate.

7. A pelletized dry feed comprising ammonium polyphosphate and urea in amounts effective for providing the pelletized feed with a nonprotein nitrogen content of at least about 5.6 weight percent, the pelletized dry feed being produced from a feed blend for pelletization comprising at least about 35 weight percent abrasive particulates, the abrasive particulates including urea, and from about 1 to about 20 weight percent urea, the pelletized feed having improved gravitational flowability compared to a pelletized feed without ammonium polyphosphate with the same nonprotein nitrogen content.

8. The pelletized dry feed as recited in claim 7 wherein the pelletized feed has about 0.6 weight percent ammonium polyphosphate, based upon the weight of the pelletized dry feed.

9. The pelletized dry feed as recited in claim 7 wherein the feed blend for pelletization comprises from about 35 to about 65 weight percent abrasive particulates.

10. The pelletized dry feed as recited in claim 9 wherein the abrasive particulates are selected from the group consisting of urea, one or more particulate minerals and mixtures thereof.

11. A pelletized dry feed comprising urea and at least about 0.6 weight percent ammonium polyphosphate, the urea and ammonium polyphosphate being effective for providing the pelletized dry feed with a nonprotein nitrogen content of at least about 8.0 weight percent, the pelletized dry feed being produced from a feed blend for pelletization comprising at least about 35 weight percent abrasive particulates, the abrasive particulates including urea, and from about 1 to about 20 weight percent urea.

12. The pelletized dry feed as recited in claim 11 wherein the feed blend for pelletization comprises from about 35 to about 65 weight percent abrasive particulates.

13. The pelletized dry feed as recited in claim 12 wherein the abrasive particulates are selected from the group consisting of urea, one or more particulate minerals and mixtures thereof.

14. A method for improving the flowability of a pelletized urea-containing feed, the method comprising mixing ammonium polyphosphate with a dry feed blend comprising an amount of urea prior to pelletization of the blend to provide a feed blend for pelletization having a nonprotein nitrogen content of at least about 5.6 weight percent, the feed blend for pelletization comprising at least about 35 weight percent abrasive particulates and the amount of ammonium polyphosphate in the feed blend for pelletization being in an amount effective for improving the gravitational flowability of the pelletized feed as compared to a pelletized feed containing the same relative amount of urea, but without ammonium polyphosphate.

15. A method for improving the flowability of a pelletized feed as recited in claim 14 wherein the feed blend for pelletization comprises at least about 0.6 weight percent ammonium polyphosphate.

16. A method for increasing the nonprotein nitrogen content of a pelletized dry feed comprising urea and ammonium polyphosphate, the method comprising:

balancing the urea and ammonium polyphosphate content of a feed blend for pelletization such that the pelletized feed has a nonprotein nitrogen content of at least about 5.6 weight percent, the feed blend for pelletization comprising at least about 35 weight percent abrasive particulates, the abrasive particulates including urea, and from about 1 to about 20 weight percent urea, and the amount of ammonium polyphosphate in the feed blend for pelletization effective for providing an increase of the rate of production of pelletized feed from the feed blend of at least about 3% relative to the production of a pelletized feed containing the same amounts of particulates without ammonium polyphosphate and the amount of ammonium polyphosphate in the pelletized feed being effective for providing improved gravitational flowability compared to a pelletized feed without ammonium polyphosphate with the same nonprotein nitrogen content.

17. The method as recited in claim 16 wherein the feed blend for pelletization comprises from about 35 to about 65 weight percent abrasive particulates.

18. The method as recited in claim 17 wherein the abrasive particulates are selected from the group consisting of urea, one or more particulate minerals and mixtures thereof.

19. The method as recited in claim 18 wherein the feed blend for pelletization comprises at least about 0.3 weight percent ammonium polyphosphate.

20. The method as recited in claim 19 wherein the feed blend for pelletization comprises at least about 0.6 weight percent ammonium polyphosphate, the urea and ammonium polyphosphate being effective for providing the pelletized dry feed with a nonprotein nitrogen content of at least about 8.0 weight percent.

* * * * *